E. Michaels,
Tool for Stripping Bark from Trees.
Nº 57,542.          Patented Aug. 28, 1866.
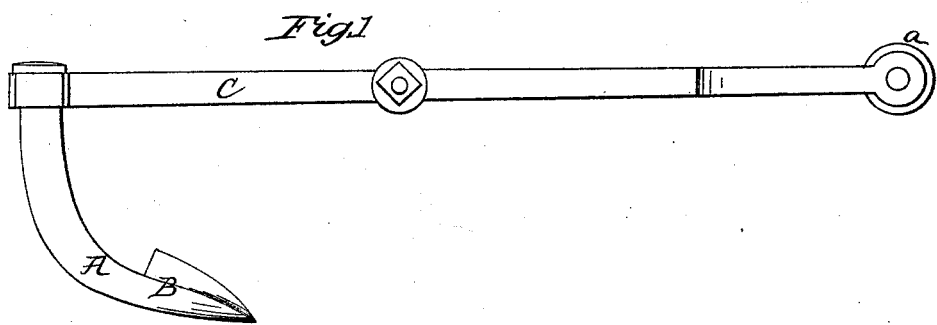
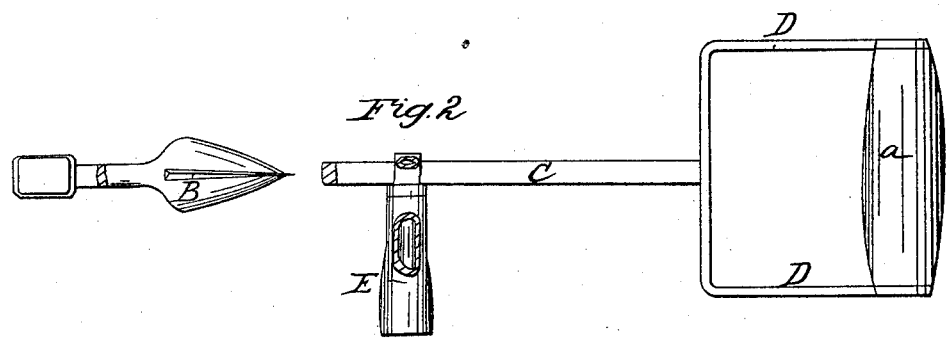

UNITED STATES PATENT OFFICE.

E. MICHAELS, OF PALERMO, MAINE.

IMPROVEMENT IN TOOLS FOR SPLITTING BARK UPON TREES.

Specification forming part of Letters Patent No. 57,542, dated August 28, 1866.

*To all whom it may concern:*

Be it known that I, E. MICHAELS, of Palermo, in the county of Waldo and State of Maine, have invented a new and Improved Tool for Stripping Bark from Trees; and I do hereby declare that the following is a full, clear, and exact description thereof, which will enable others skilled in the art to make and use the same, reference being had to the accompanying drawings, forming part of this specification, in which—

Figure 1 is a side elevation of my invention. Fig. 2 is a top view of the blade or knife. Fig. 3 is a top view of the handle.

Similar letters of reference indicate like parts.

My invention consists in a tool having a curved shank terminating in a three-edged knife, which shank is provided with a handle having two hard rollers, the one on the end for being seized by the right hand and one fitted to slide along the handle, so as to be placed in the proper position for being seized by the left hand, whereby a simple and efficient tool for stripping the bark from trees is provided.

A designates the shank of the device. This is curved or hook-shaped, and has upon its end a three-edged knife, B, with sharpened edges. Two edges of the knife point in opposite directions from the shank, and the other in an upward direction, as can be readily understood by reference to Figs. 1 and 2. This shank is connected to a handle, C, which carries upon its end a roller, a, to be taken hold of by the hand, said roller having its bearings in a frame, D, connected to said handle.

Another hand-roller or handle, E, is fitted to slide upon the handle C in such manner that it may be brought and secured at any point upon the handle to suit the operator of the tool. It is secured in any position by screwing a nut, b, or turning the said roller E so as to screw down the nut.

To use the device, take the hand-roller a in the right hand and the roller E in the other; then by inserting the point of the device under the bark of the tree it may be drawn downward, and thus cut or slit through the bark, the back of the tool the meanwhile resting against the tree under the bark. The three blades cut in as many directions, the vertical one cutting through the thickness of the bark, while the others loosen up the bark along the gash.

The tool is very simple and can be cheaply made.

What I claim as new, and desire to secure by Letters Patent, is—

A tool for peeling off the bark of trees, consisting of the shank A, the three-edged knife B, handle C, and two hand-rollers, a and E, substantially as shown and described.

E. MICHAELS.

Witnesses:
HIRAM T. BLACK,
SOPHIA M. GOODWIN.